United States Patent
Wirth

(10) Patent No.: US 8,290,121 B2
(45) Date of Patent: Oct. 16, 2012

(54) METHOD FOR PRODUCING A COMB-LIKE COLLIMATOR ELEMENT FOR A COLLIMATOR ARRANGEMENT AND COLLIMATOR ELEMENT

(75) Inventor: Stefan Wirth, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 317 days.

(21) Appl. No.: 12/654,061

(22) Filed: Dec. 9, 2009

(65) Prior Publication Data

US 2010/0158195 A1    Jun. 24, 2010

(30) Foreign Application Priority Data

Dec. 10, 2008  (DE) .......................... 10 2008 061 487

(51) Int. Cl.
*G21K 1/02* (2006.01)

(52) U.S. Cl. ....................................... 378/149

(58) Field of Classification Search .................. 378/147, 378/149, 154
See application file for complete search history.

(56) References Cited

U.S. PATENT DOCUMENTS

| | | | | |
|---|---|---|---|---|
| 5,970,118 A * | 10/1999 | Sokolov | ......................... | 378/155 |
| 6,707,884 B1 * | 3/2004 | Ogawa | ......................... | 378/154 |
| 6,980,629 B1 | 12/2005 | Hoheisel et al. | | |
| 7,362,849 B2 | 4/2008 | Hoffman | | |
| 7,362,894 B2 | 4/2008 | Ono et al. | | |
| 2004/0120464 A1 * | 6/2004 | Hoffman | ........................ | 378/147 |
| 2004/0156479 A1 | 8/2004 | Hoheisel et al. | | |
| 2006/0055087 A1 | 3/2006 | Freund et al. | | |
| 2006/0115052 A1 | 6/2006 | Hoheisel et al. | | |
| 2007/0064878 A1 | 3/2007 | Heismann | | |

FOREIGN PATENT DOCUMENTS

| | | |
|---|---|---|
| DE | 10208150 A1 | 9/2002 |
| DE | 10241424 B4 | 7/2004 |
| DE | 10305106 A1 | 8/2004 |
| DE | 10322531 A1 | 12/2004 |
| DE | 102004027158 A1 | 12/2005 |
| DE | 102005044650 B4 | 7/2008 |

* cited by examiner

*Primary Examiner* — Glen Kao

(74) *Attorney, Agent, or Firm* — Harness, Dickey & Pierce, P.L.C.

(57) ABSTRACT

A method is disclosed for producing a comb-like collimator element for a collimator arrangement. In at least one embodiment of the method, a collimator sheet extending in a first direction and made of an X-ray absorbing material is used as a support, onto which webs made of an X-ray absorbing material are formed in layers by way of a rapid prototyping technique and protrude transversely in respect of the support in a second direction.

17 Claims, 2 Drawing Sheets

METHOD FOR PRODUCING A COMB-LIKE COLLIMATOR ELEMENT FOR A COLLIMATOR ARRANGEMENT AND COLLIMATOR ELEMENT

PRIORITY STATEMENT

The present application hereby claims priority under 35 U.S.C. §119 on German patent application number DE 10 2008 061 487.4 filed Dec. 10, 2008, the entire contents of which are hereby incorporated herein by reference.

FIELD

At least one embodiment of the invention generally relates to a method for producing a comb-like collimator element for a collimator arrangement and to a collimator element.

BACKGROUND

By way of example, collimators are used for imaging using X-ray equipment such as a computed tomography scanner in order to examine a patient. The computed tomography scanner has an X-ray system with an X-ray source and an X-ray detector arranged on a gantry. The X-ray detector is generally constructed from a multiplicity of detector modules which are arranged in an adjoining linear or two-dimensional fashion. Each detector module of the X-ray detector for example comprises a scintillator array and a photodiode array which are aligned with respect to one another. The mutually aligned elements of the scintillator array and of the photodiode array form the detector elements of the detector module. The X-ray radiation incident on the scintillator array is converted into light which is converted into electrical signals by the photodiode array. The electrical signals form the starting point for the reconstruction of an image of an object or patient examined using the computed tomography equipment.

The X-ray radiation emanating from the X-ray source is scattered in the object and so scattered beams, so-called secondary beams, are incident on the X-ray detector in addition to the primary beams from the X-ray source. These scattered beams cause noise in the X-ray image and therefore reduce the perceptibility of the contrast differences in the X-ray image. In order to reduce the influence of scattered radiation, an X-ray absorbing collimator is arranged over every scintillator array, as a result of which collimator only X-ray radiation from a certain spatial direction reaches the scintillator array.

Until now, it was mainly collimators comprising a number of tungsten sheets which were used in medical technology for use in a computed tomography scanner. Collimators which permit suppression of scattered radiation in the $\phi$-direction only, that is to say in the rotation direction of the gantry, comprise a multiplicity of collimator sheets which are arranged in parallel and are aligned with respect to the X-ray focus; these are referred to as one-dimensional collimators. If the X-ray detector is enlarged in the Z-direction, that is to say in the direction of the patient axis, two-dimensional collimation is also required in the Z-direction. Such a two-dimensional collimator is described, for example, in U.S. Pat. No. 7,362,894 B2, the entire contents of which are hereby incorporated herein by reference. In this case, as the detector becomes wider, it becomes evermore difficult to produce the grid-like support mechanism with sufficient accuracy in order to keep the sheets in position.

SUMMARY

In at least one embodiment, a collimator element is facilitated which can be produced easily and is very stable.

According to at least one embodiment of the invention is directed to a method for producing a comb-like collimator element for a collimator arrangement and/or by a collimator element produced according to the method. In the production of the collimator element, a collimator sheet extending in a Z-direction and made of an X-ray absorbing material is used as a support. Webs made of an X-ray absorbing material are formed thereon in layers by means of a rapid prototyping technique, with said webs protruding, transversely in respect of the support, in a $\phi$-direction.

At least one embodiment of the invention proposes a novel method for producing a two-dimensional collimator element, which method combines together the advantages of two production techniques in a particularly expedient fashion. First of all, a collimator sheet is produced from an X-ray absorbing material, or a prefabricated collimator sheet is used, and it is used as a support for the comb-shaped collimator element. Such a support is, in particular, a prefabricated tungsten collimator sheet, as is disclosed in the prior art and already used in collimators. Here, the finished collimator element is an integral component and not an assembly of a plurality of individual sheets; it therefore has a particularly high stability.

In the second step, the support is complemented by webs, which likewise consist of an X-ray absorbing material such as, for example, tungsten or molybdenum. The webs are produced using so-called rapid prototyping—a production method in which a workpiece is constructed in layers from a shapeless, or neutrally-shaped, material by using physical and/or chemical effects. Here, the webs can be applied to the support in a very accurate fashion in terms of their width, height and position. Since it is only the webs which are produced by a rapid prototyping technique, the production time is reduced compared to a collimator element completely constructed according to the rapid prototyping technique.

Advantageously, selective laser melting is used as the rapid prototyping technique and it is particularly suitable for forming metallic components. In this technique, dense three-dimensional parts are produced from a powder, in particular a metal powder. In the process, the powder is fused in layers by a laser beam. This makes a 3D component from a number of layers fused one on top of the other which is produced with high precision by computer control.

In view of particularly good collimation of the X-ray radiation in the Z-direction as well, the webs are formed between an upper side and a lower side of the collimator and so the webs extend to the same height over the X-ray detector as the collimator sheet.

In accordance with a preferred refinement of at least one embodiment, the thickness of the webs increases in a radial direction, away from the Z-direction, from the upper side to the lower side. In particular, the thickness of the webs increases continuously.

Optimal matching of the alignment of the webs in respect of a focus of the X-ray source is obtained by, in accordance with a further preferred refinement of at least one embodiment, a number of webs having a tilting design, particularly in the end regions of the support. In particular, the webs are tilted by an angle of between 0° and 20° in respect of the vertical. In order that the webs respectively extend parallel to the propagation direction of the beam fan, the webs are arranged perpendicularly in the central region of the support and tilt evermore strongly inward toward the center of the support with increasing distance from the center of the support. This means that in the end regions of the support, the distance between two adjacent webs is smaller on the upper side of the support than the distance on the lower side of the support.

A plurality of the collimator elements are preferably assembled in the φ-direction in order to form a collimator arrangement, in particular for an X-ray detector of a computed tomography scanner. Hence, arbitrarily sized collimator arrangements can be produced which satisfy the requirements for covering the entire X-ray detector in both the φ- and Z-directions. In the process, each individual pixel of the X-ray detector is in particular bounded on four sides by collimator sheets and webs of the collimator arrangement. However, it is also possible, particularly in the Z-direction, for two or more pixels to be located between two adjacent webs. In this refinement, the length of the collimator sheets in the Z-direction corresponds to the width of the X-ray detector and so a multiplicity of comb-like collimator elements are only arranged next to one another in the φ-direction.

Here, the webs form spacers and define the distance between the adjacent collimator elements. Thanks to the varying thicknesses of the webs, the collimator sheets of the collimator arrangement are closer to one another in the region of their upper side than in the region of their lower side. Hence, the collimator sheets in the collimator arrangement are respectively aligned with the focus of the X-ray source.

Preferably, a plurality of comb-like collimator elements are arranged one above the other and interconnected, as a result of which a desired height of the collimator arrangement is set.

Expediently, the plurality of collimator elements are adhesively interconnected; in particular they are adhesively bonded. The adhesive connection is produced between the webs of a collimator element and the collimator sheet of the adjacent collimator element. In the case of collimator elements with webs formed on both sides, webs of two adjoining collimator elements which are oriented to one another are adhesively bonded to one another.

According to at least one embodiment the invention, the a collimator element is produced according to one of the preceding embodiments of the method.

BRIEF DESCRIPTION OF THE DRAWINGS

An example embodiment of the invention will be explained in more detail on the basis of a drawing in which, in a very much simplified fashion.

Figure 1:
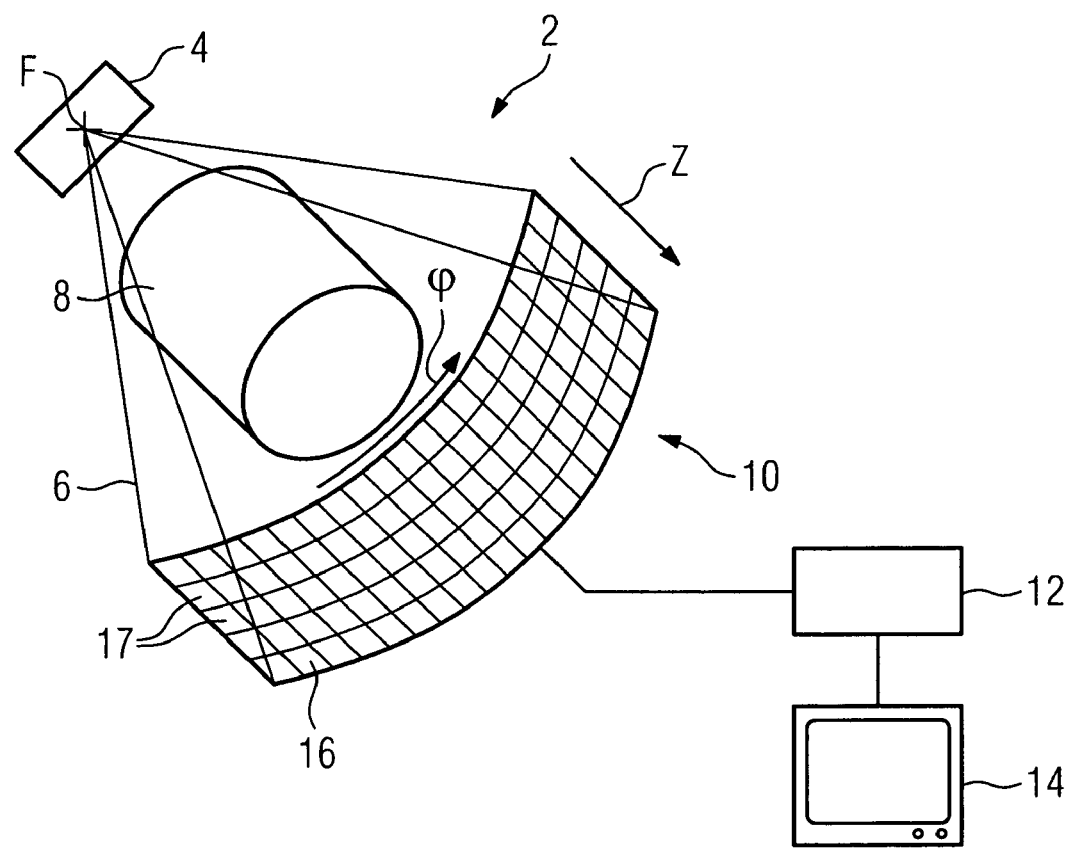
FIG. 1 shows a schematic illustration of a computed tomography scanner.

In the figures, parts with the same effect are provided with the same reference signs.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a computed tomography scanner 2 which comprises an X-ray beam source 4, with an X-ray beam fan 6 emanating from the focus F thereof. The X-ray beam fan 6 penetrates an object 8 to be examined or a patient and is incident on an X-ray detector 10.

The X-ray beam source 4 and the X-ray detector 10 are arranged opposite to one another on a gantry (not illustrated in this case) of the computed tomography scanner 2, which gantry can be rotated in a $\phi$-direction about a system axis Z (=patient axis) of the computed tomography scanner 2. Thus, the $\phi$-direction constitutes the circumferential direction of the gantry and the Z-direction constitutes the longitudinal direction of the object 8 to be examined.

When the computed tomography scanner 2 is operating, the X-ray beam sources 4 and the X-ray detector 10, both arranged on the gantry, rotate about the object 8, with X-ray records of the object 8 being obtained from different projection directions. For each X-ray projection, the X-ray radiation which passed through the object 8 and was thereby attenuated is incident on the X-ray detector 10. In the process, the X-ray detector 10 generates signals which correspond to the intensity of the incident X-ray radiation. Subsequently, an evaluation unit 12 calculates one or more two- or three-dimensional images of the object 8 from the signals determined by the X-ray detector 10 in a known fashion, with it being possible to display the images on a display element 14.

In the present example, the X-ray detector 10 has a multiplicity of detector modules 16 which are arranged next to one another in the $\phi$-direction. Each of the detector modules 16 comprises a plurality of detector elements 17 extending in the Z-direction. In this example embodiment, the detector elements 17 are designed in the manner of scintillation detectors.

The X-ray radiation which passed through the object 8 is scattered in the object 8 and so there are secondary beams which reduce the quality of the images obtained by the computed tomography scanner 2. In order to limit the influence of the secondary radiation, a parallel beam path of the beams incident on the X-ray detector 10 is produced using a collimator arrangement 18 (shown in part in FIG. 3).

Figure 2:
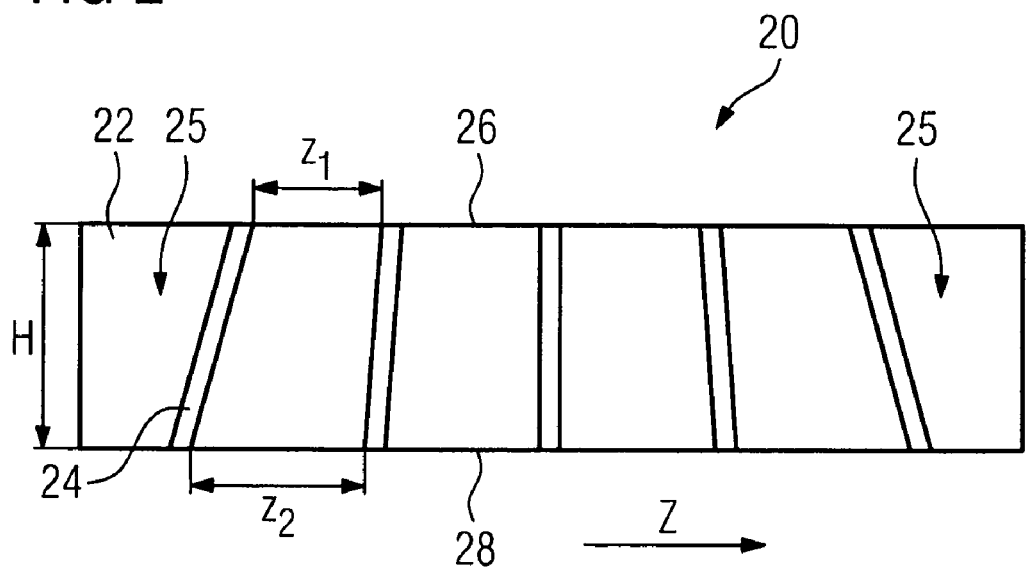
FIG. 2 shows a side view of a comb-like collimator element.

The collimator arrangement 18 comprises a plurality of comb-like collimator elements 20 (visible in FIG. 2 and FIG. 3) which are arranged next to one another in the $\phi$-direction and are interconnected. Each comb-like collimator element 20 has a collimator sheet 22 which, in this exemplary embodiment, is composed of tungsten. The collimator sheet 22 is used as a support on which a plurality of webs 24 of an X-ray absorbing material such as tungsten or molybdenum protruding in the $\phi$-direction are formed by means of selective laser melting.

The webs 24 extend to the same height H as the collimator sheet 22. Furthermore, all webs 24 are always directed toward the focus F of the X-ray source 4 when the computed tomography scanner 2 is operating; this means that the webs 24 are arranged perpendicularly in the central region of the collimator sheet 22 and that the webs 24 tilt inward toward the center of the collimator sheet 22 in the end regions 25. In the process, a distance $z_1$ between two adjacent webs 24 on an upper side 26 of the collimator sheet 22 is smaller than a distance $z_2$ on a lower side 28 of the collimator sheet 22. The tilting angle of the webs 24 in respect of the vertical lies between 0° and 20°, depending on the position of the respective web 24. What holds true here is that as the distance of a web increases from the center, the tilting angle thereof increases.

Figure 3:
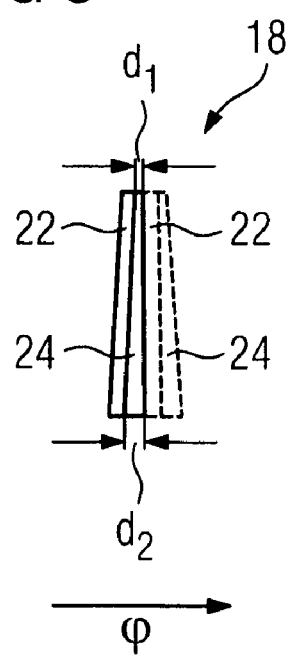
FIG. 3 shows a front view of a section of a collimator arrangement.

Moreover, the webs 24 have a varying thickness in the $\phi$-direction. In the region of the upper side 26, the thickness $d_1$ is smaller than the thickness $d_2$ in the region of the lower side 28, as shown in FIG. 3. Thanks to the thickness of the webs 24 increasing in the direction of the lower side 26, all collimator elements 20 are directed at the focus F when they are assembled to form the collimator arrangement 18 and the collimator arrangement 18 extends in the $\phi$-direction in the shape of a fan and follows the contour of the arced X-ray detector 10.

In the illustrated example embodiment, the collimator arrangement 18 is produced by positioning a plurality of comb-like collimator elements 20 next to one another in the $\phi$-direction and fixedly interconnecting said elements, in particular by adhesively bonding them to one another. A plurality of collimator elements 20 can also be arranged one above the other in order to increase the height of the collimator arrangement 18. If the length of the collimator sheets 22 in the Z-direction does not correspond to the width of the X-ray detector 10, it is also possible for two or more collimator elements 20 with suitably chosen lengths to be positioned behind one another in the Z-direction such that the detector surface is completely covered by the collimator arrangement 18 in the Z-direction.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for producing a comb-like collimator element for a collimator arrangement, the method comprising: using a collimator sheet, extending in a first direction and made of an X-ray absorbing material, as a support; forming webs made of an X-ray absorbing material onto the support, the webs being formed in layers by way of a rapid prototyping technique and the webs protruding transversely in respect to the support in a second direction.

2. The method as claimed in claim 1, wherein selective laser melting is used as the rapid prototyping technique.

3. The method as claimed in claim 2, wherein the webs are formed between an upper side and a lower side of the collimator sheet.

4. The method as claimed in claim 3, wherein the thickness of the webs relatively increases in the second direction from the upper side to the lower side.

5. The method as claimed in claim 2, wherein a number of the webs are formed to include a tilted design.

6. The method as claimed in claim 5, wherein the webs are formed to include a tilted design, in the end regions of the support.

7. The method as claimed in claim 1, wherein the webs are formed between an upper side and a lower side of the collimator sheet.

8. The method as claimed in claim 7, wherein the thickness of the webs relatively increases in a direction radial to the first direction from the upper side to the lower side.

9. The method as claimed in claim 1, wherein a number of the webs are formed to include a tilted design.

10. The method as claimed in claim 9, wherein the webs are formed to include a tilted design, in the end regions of the support.

11. The method as claimed in claim 1, wherein a plurality of collimator elements are produced and assembled in the second direction in order to form a collimator arrangement.

12. The method as claimed in claim 11, wherein the plurality of collimator elements are arranged one above the other and interconnected.

13. The method as claimed in claim 12, wherein the plurality of collimator elements are adhesively interconnected.

14. The method as claimed in claim 11, wherein a plurality of collimator elements are produced and assembled in the second direction in order to form a collimator arrangement for an X-ray detector of a computed tomography scanner.

15. The method as claimed in claim 14, wherein the plurality of collimator elements are arranged one above the other and interconnected.

16. The method as claimed in claim 15, wherein the plurality of collimator elements are adhesively interconnected.

17. The method as claimed in claim 11, wherein the plurality of collimator elements are adhesively interconnected.

* * * * *